May 4, 1971  MASAAKI UCHIDA  3,577,291
PROCESS FOR CONTINUOUSLY MOLDING BOTTLE FROM
THERMOPLASTIC RESIN, CHARGING AND SEALING
Filed Jan. 23, 1969  5 Sheets-Sheet 1
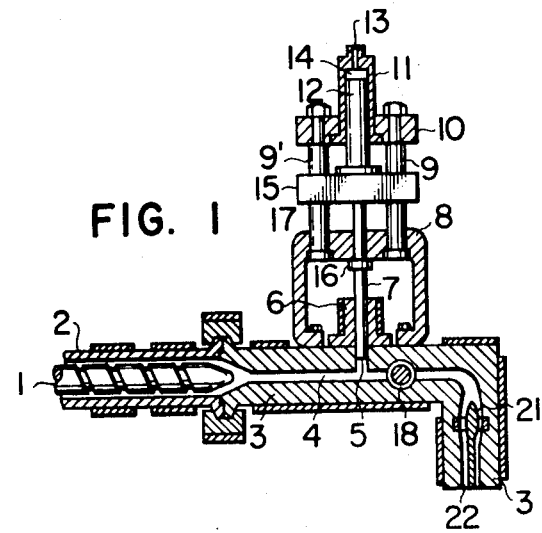
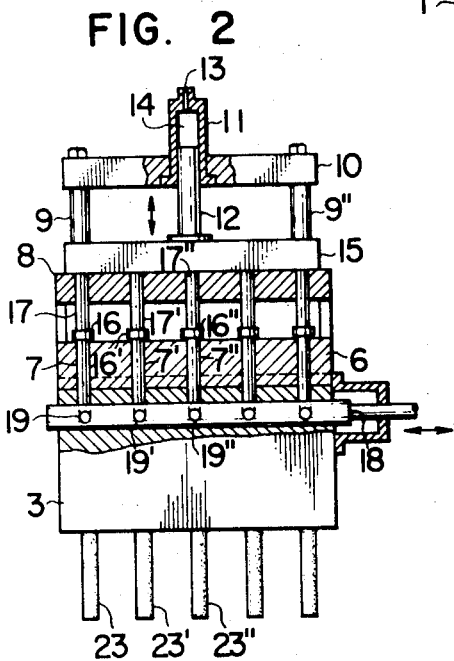
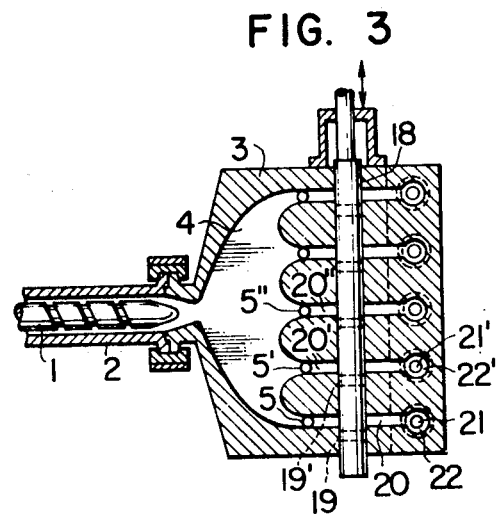
INVENTOR.
MASAAKI UCHIDA
BY
Elvie S. Gerber
ATTORNEY.

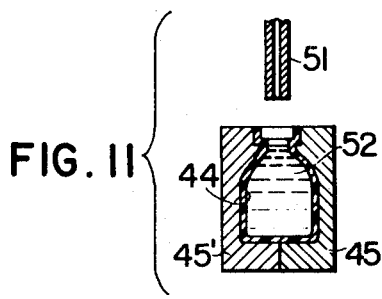
FIG. 11
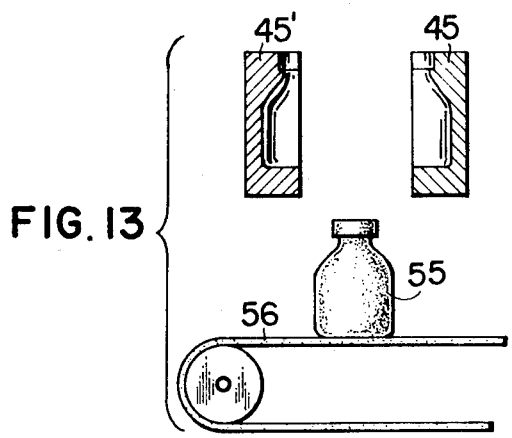
FIG. 13
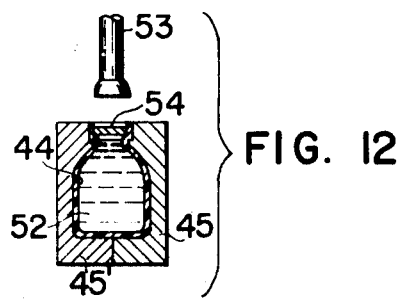
FIG. 12
FIG. 14
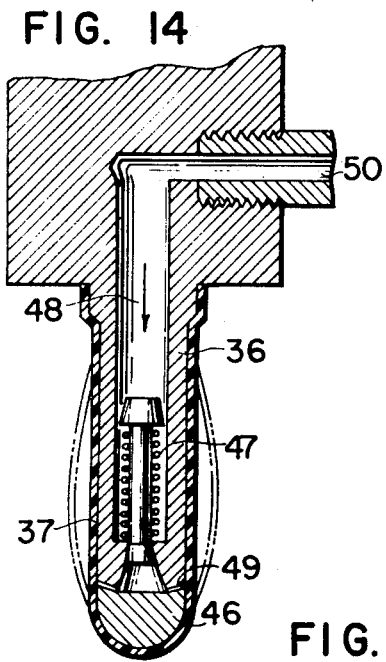
FIG. 15A
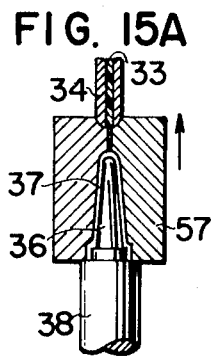
FIG. 15B
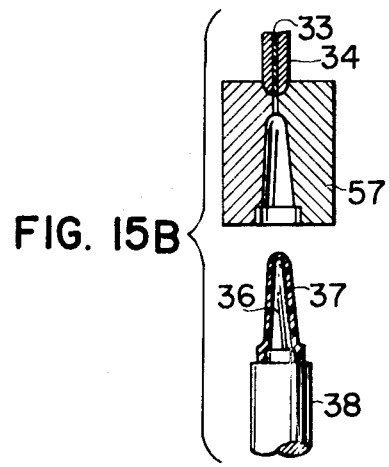
FIG. 16
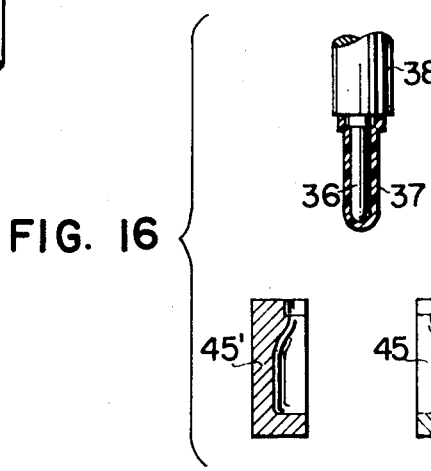
FIG. 17
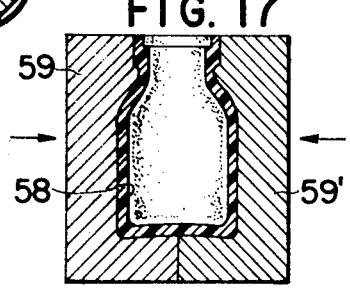

United States Patent Office 3,577,291
Patented May 4, 1971

3,577,291
PROCESS FOR CONTINUOUSLY MOLDING
BOTTLE FROM THERMOPLASTIC RESIN,
CHARGING AND SEALING
Masaaki Uchida, 5, 4-chome, Fukagawa Takahashi,
Koto-ku, Tokyo, Japan
Filed Jan. 23, 1969, Ser. No. 793,315
Claims priority, application Japan, Feb. 1, 1968,
43/5,711; Feb. 3, 1968, 43/6,273; Feb. 8, 1968,
43/7,450
Int. Cl. B29c 17/07; B65b 7/16
U.S. Cl. 156—64                              5 Claims

ABSTRACT OF THE DISCLOSURE

A hollow plastic tube is molded of thermoplastic resin. The tube is transferred to a split metal mold and molded therein into the form of a bottle or container. The bottle or container, while still within the split metal mold, is checked for pinholes and/or other crack defects by feeding compressed air into the bottle. Those bottles or containers found to be non-defective are selected, charged, sealed and packaged.

BACKGROUND OF THE INVENTION

This invention relates to a process for checking a bottle or container for defects.

In the process of the present invention a hollow plastic tube is molded of thermoplastic resin and transferred into a solid metal mold, wherein it is molded into a bottle or container. Compressed air is fed into the prepared bottle or container while it is still within the mold. The prepared bottle or container is checked for pinholes or other crack defects with the aid of a pressure gauge, which is in communication with the compressed air. The checked and completed bottle or container is then filled with the desired material through the nozzle of a pressure-driven filling machine.

DESCRIPTION OF THE PRIOR ART

Containers or bottles are produced by the conventional and well-known methods of extrusion or injection molding. During the operation of the molding machine, bottles or containers prepared by extrusion or injection molding have not been checked or inspected for a pinhole or other crack defects. Thus, the bottles or containers were charged without being prechecked. The failure to precheck the bottles or containers before filling caused a number of problems.

With the method of the instant invention, bottles and containers can be checked for pinhole or other crack defects. The method of the invention enables one to mold bottles or containers, to check them for defects, and to select non-defective bottles or containers for charging, sealing and packaging. Further, the method of the invention enables one to perform these steps continuously.

SUMMARY OF THE INVENTION

The main objective of this invention is to provide a process in which a hollow plastic tube is formed of thermoplastic synthetic resin. The formed hollow plastic tube is transferred into a split metal molding section and a bottle or container is molded therein. The molded bottle or container is checked for pinholes or other crack defects while still in the mold. The material to be filled into the bottle is filled only into checked and complete bottles or containers which have been found to be non-defective. The charged, checked bottle or container is then sealed and packaged.

According to this invention, a hollow plastic tube is molded from thermoplastic resin. The prepared hollow plastic tube is formed in the form of bottle or container within a split metal mold section, and is checked for pinhole or other crack defects by blowing air into the bottle within the molding section. Only bottles or containers found to be non-defective are charged with the material or substance to be charged. The charged bottles are then sealed and packaged simultaneously.

The invention will be more clearly illustrated in the following detailed description, especially when taken in connection with the accompanying drawings, which show, by way of example only, a preferred embodiment of the invention.

In the drawings:

FIG. 1 is a side cross-sectional view of a plastic resin injection molding machine;

FIG. 2 is a front view, partly in section, of the machine of FIG. 1;

FIG. 3 is a top cross-sectional view of FIG. 1;

FIGS. 11 and 12 are side cross-sectional views showing the charging and sealing of the bottle or container;

FIG. 13 is a partly in plan and partly in cross-section view showing the releasing of the completed bottle or container onto a conveyor belt;

FIG. 14 is a cross-sectional view of the machine for obtaining a required condition of plasticity;

Figure 4:
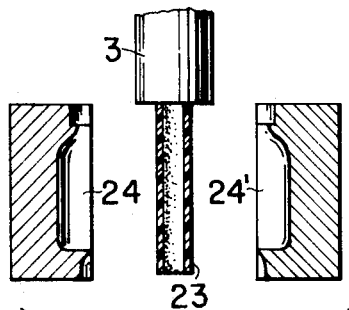
FIG. 4 is a cross-sectional view showing the forming of bottles or containers.
Figure 6:
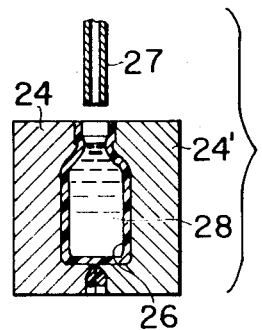
FIG. 6 is a cross-sectional front view of the preferred embodiment relating to the process for manufacturing of a hollow plastic tube made from thermoplastic resin.
Figure 5:
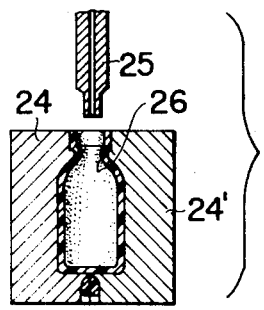
FIG. 5 is a cross-sectional view showing the bottle after its formation.
Figure 7:
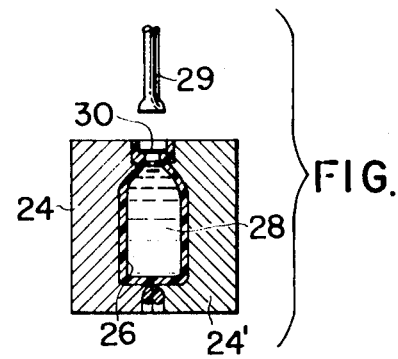
FIG. 7 is a cross-sectional side view showing the sealing of the bottle.
Figure 8:
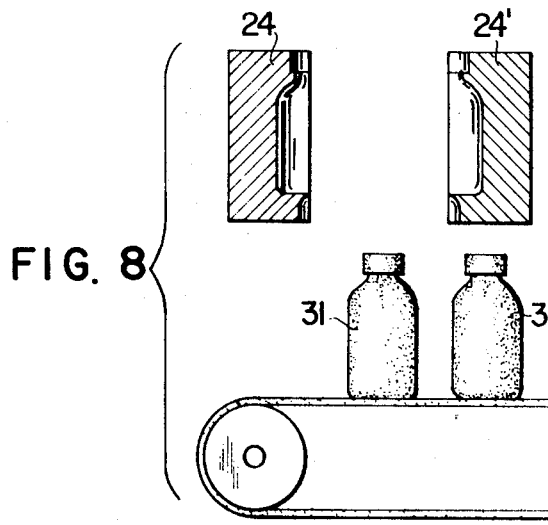
FIG. 8 is a view, partly in cross-sectional, partly in plan, showing the opening of the mold and the conveyance of the bottle.
Figure 9:
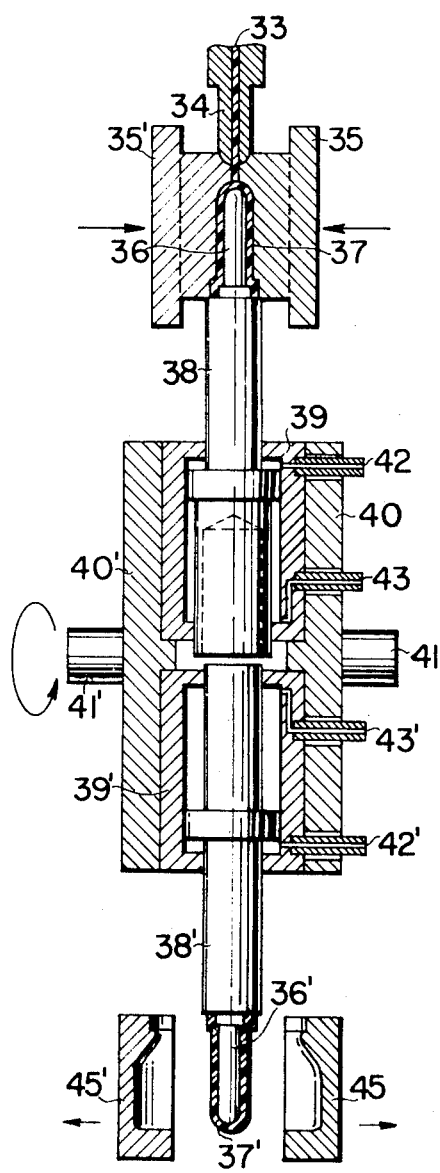
FIGS. 9 and 10 are side cross-sectional views showing machines for molding bottles.
Figure 10:
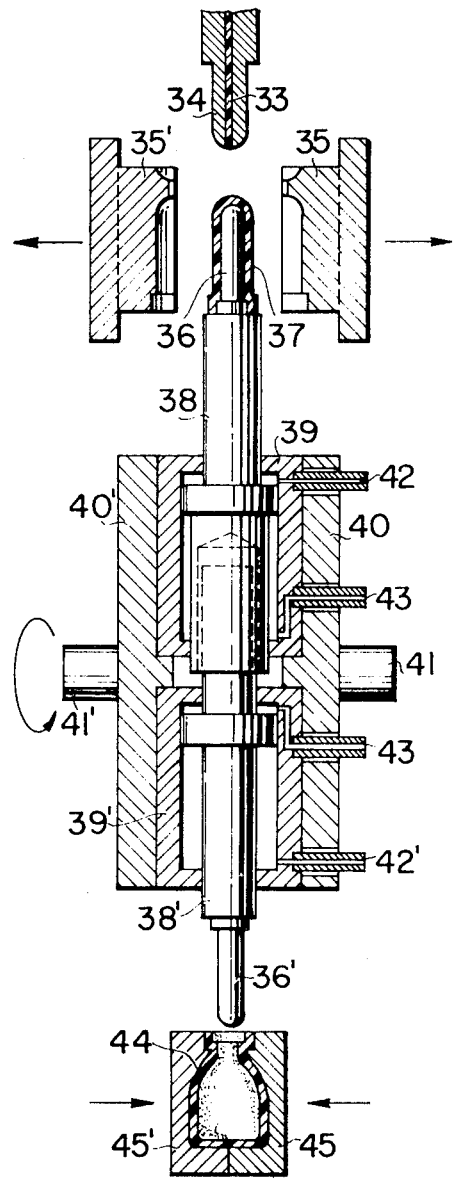
Figure 18:
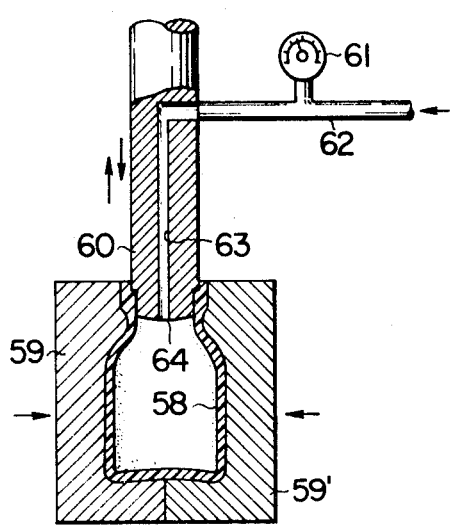
Figure 19:
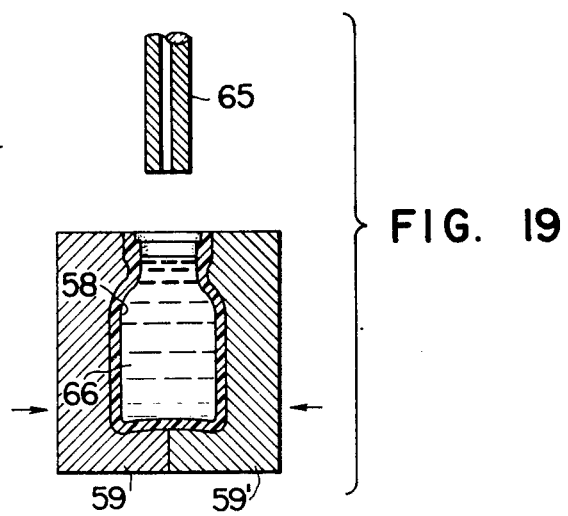
Figure 20:
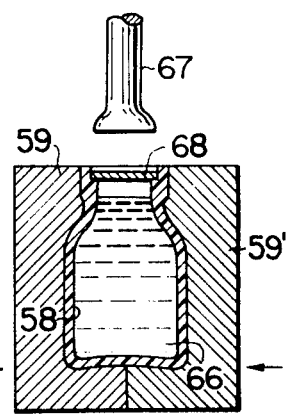

FIGS. 15A and B are diagrams for explanation of molding bottles or containers:

FIGS. 16, 17 and 18 are diagrams showing the charging of any material or substances into the bottle or container, sealing the charged bottle or container and releasing the sealed bottle or container;

FIG. 19 is a related view of a female screw and a blowing view in accordance with FIG. 14;

FIG. 20 is a related view of the required condition of plasticity with movable moulding section.

Figure 21:
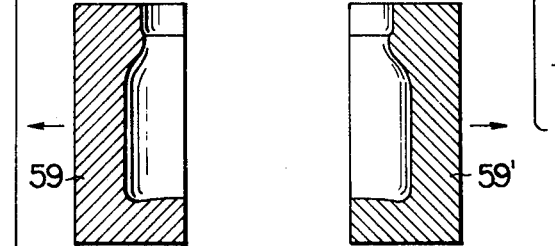

FIG. 21 is a partly in plan and partly in cross-section view showing the releasing of the completed bottle or container onto conveyor belt.

PREFERRED EMBODIMENT OF THE INVENTION

The following is a preferred embodiment of the method of the invention with respect to a process for molding a bottle or container from thermoplastic resin by extrusion mold, charging any substance or materials into the prepared bottle or container, sealing and packaging the charged bottle or container. FIGS. 1 to 8 relate to this preferred embodiment.

Referring to the figure, a screw 1, of a plastic resin molding machine is within a cylinder 2. The screw 1 feeds a thermoplastic resin into a cylinder 3 having a passage 4 for the thermoplastic resin. A plurality of reservoirs 5, 5' and 5" for thermoplastic resin are provided, each reservoir being a bore in a storage chamber 6. A plurality of extrusion plungers 7, 7' and 7" operate in a storage chamber 6 within a frame 8. A supporting plate 10 rests on supporting bolts 9, 9' and 9". A hydraulic cylinder 11 on plate 10 contains a hydraulic piston 12, the cylinder having passages 13 and 14 for oil. The piston 12 drives plate 15, which moves freely on bolts 9, 9' and 9". Adjustable nuts 16, 16' and 16" are respectively fitted to extrusion plungers 7, 7' and 7". Rods 17, 17' and 17" are respectively fixed to driving plate 15. The mechanism also includes a switching valve 18, having ports 19, 19' and 19". The ports, when open, lead to passages 20, 20' and 20", the passages having plurality of mandrels 21, 21' and 21". A plurality of extruding mouths 22, 22' and 22" for thermoplastic resin, at the termination of the passages, each forms a hollow plastic tube 23, 23' and 23". There are a number of a split metal molding sections 24, 24'; each pair being associated with a blowing nozzle 25, 25' and 25". A bottle 26 made of thermoplastic resin is positioned beneath one of the plurality of charging nozzles 27, 27' and 27". The substance 28 is filled within the bottle and the bottle being sealed by one of a plurality of sealing stamps 29, 29' and 29", using a closure cap 30. A plurality of packages, bottles or containers 31 and 31' are then positioned on belt conveyor 32 when the molds are opened.

For example, a polyethylene resin, which is obtained by an intermediate process, is supplied to the storing chamber 6 for the plastic resin, by extruding the heated plastic resin by way of the screw 1 and cylinder 2. Switching valve 18 is closed, when extruding the heated plastic resin into the storing chamber 6. The volume of plastic resin supplied to each plunger is set by the position of the adjustable nut 16. The extruded resin shifts extruding plungers 7, 7' and 7", driving plate 15 and rod 17 in an upward direction, until adjustable nuts 16, 16' and 16" reach the pressure supporting member 8. A shifting movement caused by the extruded resin terminates when the pressure supporting member 8 is reached. Simultaneously, as pressure supporting member 8 is reached, the switch valve 18 is opened by a time-limit switch provided with the driving plate 15 (not shown). When the switch valve opens, each of the plastic reservoirs 5, 5' and 5" engages with the respective diverging passages 20, 20' and 20", and then forthwith an oil-pressure is applied to hydraulic cylinder 11 mounted on the supporting plate 10 from an oil-path 13. As a result, hydraulic cylinder 12 is quickly pushed downward, because of the oil-pressure, and carries each of the rods 17, 17' and 17" by way of the driving plate 15. Thus, the heated plastic resin filled within respective reservoirs 5, 5' and 5" in the storage chamber 6 is fed into the respective diverging passages 20, 20' and 20". At this time, a number of hollow plastic tubes 23, 23' and 23" are formed by extruding a desired and determined volume of resin from the extrusion mouths 22, each having a mandrel 21, 21' and 21". Consequently, the extruded hollow plastic tubes 23, 23' and 23" are conveyed to the mold sections 24, 24', the molds closed and then transferred to an apparatus having a plurality of air blowing nozzles 25 to blow air into the hollow plastic tubes. After the hollow plastic tube is prepared, air is blown into it within the mold sections and the tube is then molded in the form of the desired bottle (or container). The prepared bottle is then transferred to an apparatus having a number of filling nozzles 27 to fill a material 28, such as milk, from a tank of milk. After being filled, the botle is sealed with a sealing cap 30 by a sealing stamp 29. The closed mold sections 24, 24' are opened and the completed bottle is deposited on a belt conveyor 32 which serves to transfer completed articles 31, 31'.

Bottles can be produced efficiently and continuously by employing in the method of the invention a plurality of mold sections, female mold sections and reciprocable mold sections. The method of the invention is readily adaptable to the automatic filling of fluids such as milk or the filling of solids, as, for example, using solid tablets having a diameter of .01 to 10 mm.

In the method of extrusion molding, as shown in FIGS. 9 to 16, a molded polystyrene bottle or container 44 is transferred while still within reciprocable mold sections 45, 45' to a filling apparatus (not shown). The bottles are filled with a fluid such as a lactate drink or a fruit juice through a filling nozzle 51 (see FIG. 11). The filled bottle is then sealed with a closing cap 54 at the stamper 53 of a sealing nozzle (see FIG. 12). The sealed bottle (or container), contained within reciprocable mold sections 45, 45' is then released onto the belt conveyor 56 and conveyed as a completed article 55.

A method for checking the bottle or container, while still within the mold sections, for pinhole or other crack defects is as follows:

In the FIGS. 17 to 21, a plastic bottle 58 is molded within the sections 59 and 59'. The apparatus includes an air blowing nozzle 60, a pressure gauge 61, an inlet 62, an air passage 63 and a mouth 64 for blowing air. A separate apparatus includes a filling nozzle 65 (for the filling material 66), a filling stamp 67 for the cap 68. The filled bottle 69 is transferred by a conveyor belt 70.

Compressed air is blown, by air blowing nozzle 60, into an opening in the extruded or injection molded plastic bottle or container 58, while the bottle or container is within the mold sections 59, 59'. If there is a pinhole or other crack defects, the air will escape. Therefore, the pressure gauge does not move and indicate a predetermined or desired point, i.e., 30 g./cm.$^2$ in gauge more than 1 g./cm.$^2$ As a result, the filling nozzle of the filling machine, the filling nozzle 65 of the filling machine (not shown), the stamper 67 of the sealing machine (not shown), and an apparatus (not shown) for carrying the cap 68 will halt their operation, as they are all operatively electrically connected to the pressure gauge 61 and are activated when the pressure meter moves. Accordingly, the bottles can be checked, the defective ones rejected, and the non-defective ones selected for filling in an automatic and continuous process. The incomplete bottle (or container) may also be checked by vacuuming until —30 g./cm.$^2$ less than 1 g./cm.$^2$ after having blown in the compressed air.

Without further analysis, the foregoing will so fully reveal the gist of the present invention that others can, by applying current knowledge, readily adapt it for variout applications without omitting features which fairly constitute essential characteristics of the generic and specific aspects of this invention and, therefore, such adaptations should and are intended to be comprehended within the meaning and range of equivalent of the following claims.

What is claimed is:

1. A successive process for manufacturing a sealed container, which comprises the steps of feeding thermoplastic resin within mold sections, forming a container within said mold sections by feeding compressed air into said thermoplastic resin to expand same outwardly to conform with the interior configuration of said mold sections, continuing to feed said air after formation of the container within said mold sections and checking the value of pressure of said compressed air, rejecting the subsequent charging and sealing operations of said container when the checked value of the pressure indicates the presence of a defect such as a pinhole passing through the container charging materials into the container within said mold sections when the checked value of the pressure indicates that the container is free from the defect, and sealing the charged container while within the mold sections.

2. A successive process for manufacturing a sealed container, which comprises the steps of feeding thermoplastic resin within mold sections, forming a container within said mold sections by feeding a first charge of compressed air into said thermoplastic resin to expand the same outwardly to conform with the interior configuration of said mold sections, feeding a second charge of compressed air through an opening of said container within said mold sections, checking the value of pressure of said second charge of compressed air, rejecting the subsequent charging and sealing operations of said container when the checked value of the pressure indicates the presence of a defect such as a pinhole passing through the container, filling materials into the container within said mold sections when the checked value of the pressure indicates that the container is free from the defect, and sealing the charged container while within the mold sections.

3. A successive process for manufacturing a sealed container as claimed in claim 2, wherein the step of checking the value of pressure of said second charge of compressed air is effected by a pressure gauge operatively electrically connected to subsequent charging and sealing operations, the charging and sealing operations are rejected when the pressure gauge does not indicate above a predetermined value, and the charging and the sealing operations are effected when the pressure gauge indicates above the predetermined value.

4. A successive process for manufacturing a sealed container, which comprises the steps of feeding thermoplastic resin within mold sections, forming a container within said mold sections by feeding compressed air into said thermoplastic resin to expand same outwardly to conform with the interior configuration of said mold sections, applying a vacuum to said formed container and checking the value of vacuuming, rejecting the subsequent charging and sealing operations of said container when the checked value indicates the presence of a defect such as a pinhole passing through the container, charging materials into the container within said mold section when the checked value indicates that the container is free from the defect, and sealing the charged container within the mold sections.

5. A successive process for manufacturing a sealed container as claimed in claim 4, wherein the step of checking the value of vacuuming is effected by a pressure gauge operatively electrically connected to subsequent charging and sealing operations, the charging and sealing operations are rejected when the pressure gauge does not indicate below a predetermined value, and the charging and the sealing operations are effected when the pressure gauge indicates below the predetermined value.

References Cited
UNITED STATES PATENTS

| | | | |
|---|---|---|---|
| 2,573,053 | 10/1951 | Pearlman | 73—49.2UX |
| 2,606,657 | 8/1952 | Berthelsen | 73—45.1X |
| 3,374,887 | 3/1968 | Paruolo | 73—45.1X |
| 3,377,844 | 4/1968 | Gandolfo | 73—49.2 |
| 3,423,990 | 1/1969 | Martin | 73—45.1 |
| 3,461,716 | 8/1969 | Thomson | 73—45.1 |
| 3,462,996 | 8/1969 | Frank | 73—49.2X |
| 3,479,420 | 11/1969 | Wilson et al. | 264—98X |

FRANK W. LUTTER, Primary Examiner

W. L. MENTLIK, Assistant Examiner

U.S. Cl. X.R.

99—171R; 156—69, 83, 245, 145, 156; 264—94, 98